United States Patent
Hashiguchi

(10) Patent No.: US 9,030,605 B2
(45) Date of Patent: May 12, 2015

(54) STUDIO CAMERA ADAPTER AND STUDIO CAMERA ADAPTER SYSTEM

(71) Applicant: Nihon Video System Co., Ltd., Tsushima-shi, Aichi (JP)

(72) Inventor: Kentaro Hashiguchi, Tsushima (JP)

(73) Assignee: Nihon Video System Co., Ltd., Tsushima-shi (JP)

( * ) Notice: Subject to any disclaimer, the term of this patent is extended or adjusted under 35 U.S.C. 154(b) by 0 days.

(21) Appl. No.: 14/053,501

(22) Filed: Oct. 14, 2013

(65) Prior Publication Data

US 2014/0125829 A1    May 8, 2014

(30) Foreign Application Priority Data

Oct. 15, 2012    (JP) .................................. 2012-228328

(51) Int. Cl.
| | |
|---|---|
| *H04N 5/232* | (2006.01) |
| *H04N 5/225* | (2006.01) |
| *H04N 5/073* | (2006.01) |
| *H04N 5/222* | (2006.01) |

(52) U.S. Cl.
CPC .......... *H04N 5/23203* (2013.01); *H04N 5/0733* (2013.01); *H04N 5/2251* (2013.01); *H04N 5/222* (2013.01)

(58) Field of Classification Search
CPC . H04N 1/00286; H04N 5/222; H04N 5/2251; H04N 5/2252; H04N 5/23203; H04N 5/2222
USPC ..................... 348/375, 722, 333.07; 396/422; 352/243
See application file for complete search history.

(56) References Cited

U.S. PATENT DOCUMENTS

| | | | | |
|---|---|---|---|---|
| 5,229,798 | A | * | 7/1993 | Brown .......................... 352/243 |
| 5,341,171 | A | * | 8/1994 | Mori et al. .................... 348/373 |
| 6,757,011 | B1 | * | 6/2004 | Takeda et al. ............. 348/208.7 |
| 6,773,110 | B1 | * | 8/2004 | Gale ............................. 352/243 |
| 2005/0058442 | A1 | * | 3/2005 | Takeda ........................... 396/55 |

FOREIGN PATENT DOCUMENTS

| | | |
|---|---|---|
| JP | 63-45589 U | 3/1988 |
| JP | 2009-89114 A | 4/2009 |

OTHER PUBLICATIONS

Notification of Reasons for Refusal, including the English translation, mailed Dec. 4, 2012, issued in corresponding Japanese Application No. 2012-228328, filed Oct. 15, 2012, 9 pages.

* cited by examiner

*Primary Examiner* — Paul Berardesca
(74) *Attorney, Agent, or Firm* — Christensen O'Connor Johnson Kindness PLLC

(57) ABSTRACT

To provide a studio camera adaptor capable of easily controlling a remote controller even when shooting takes place at audience seats in a studio The present invention provides a studio camera adaptor for using a portable video camera as a studio camera, the studio camera adaptor including: a main body unit having: a bottom part for having the portable video camera attached thereto; and a side wall part rising from the bottom part; and a remote controller attachment unit provided to the side wall part for having a remote controller attached thereto, the remote controller being used for adjustment of at least one of zoom, focus, and aperture of the portable video camera.

10 Claims, 8 Drawing Sheets

STUDIO CAMERA ADAPTER AND STUDIO CAMERA ADAPTER SYSTEM

TECHNICAL FIELD

The present invention relates to a studio camera adaptor for using a portable video camera as a studio camera, and relates to a studio camera adaptor system using the studio camera adaptor.

BACKGROUND ART

Production of TV programs in the studios at TV stations and production companies uses large and expensive video cameras called studio cameras. Such cameras capture high-quality video and also have tally lamps and view finders such that multiple studio cameras are simultaneously used. The tally lamp displays tally signals from a switcher, and the view finder displays return videos from the switcher.

Recently, the performance of small and inexpensive portable video cameras has dramatically improved, and thereby this has made it possible to shoot video of quality high enough for broadcasting using portable video cameras. Thus, there is a need to employ such portable video cameras for broadcast use in order to reduce TV program production costs.

However, the portable video camera is not supposed to be used as a studio camera, and thereby is not suitable for shooting video simultaneously using multiple video cameras.

In view of the above situation, Patent Document 1 discloses a technique using a studio camera adaptor that includes:
  an attachment unit for a portable video camera;
  a portable video camera attached to the attachment unit;
  an attachment unit for a view finder;
  the view finder attached to the attachment unit;
  an on-air tally lamp;
  an intercom function;
  a connector panel for transferring these signals; and
  an electronic circuit unit for processing these signals. By attaching the studio camera adaptor to the portable video camera and adding necessary functions the portable video camera lacks, the portable video camera may be used as a studio camera.

PRIOR ART REFERENCE

Patent Document

Patent Document 1: JP-A-2009-89114

SUMMARY OF THE INVENTION

Problems to be Solved by the Inventions

A shooting place large enough for a camera operator is not always provided in the studio, and for example, the camera operator sometimes has to shoot a scene while surrounded by the audience in audience seats. In the above case, the studio camera adaptor is attached to the portable video camera, and the portable video camera is attached to a tripod for shooting. Shooting requires adjustment of zoom, focus, and aperture, and the adjustment is usually performed through a remote controller attached to a pan bar of the tripod. However, when the shooting takes place in the audience seats, it is difficult to operate the controller attached to the pan bar because the controller is positioned at a height the same as the legs of the audience.

The present invention is made in view of the above circumstances and thereby provides a studio camera adaptor that facilitates operation of a remote controller even when shooting takes place at audience seats in a studio.

Means for Solving the Problems

The present invention provides a studio camera adaptor for using a portable video camera as a studio camera, the studio camera adaptor including:
  a main body unit including:
    a bottom part for having the portable video camera attached thereto; and
    a side wall part rising from the bottom part; and
  a remote controller attachment unit provided to the side wall part for having a remote controller attached thereto, the remote controller being used for adjustment of at least one of zoom, focus, and aperture of the portable video camera.

Although it has been common sense conventionally to use the remote controller attached on the pan bar, the present inventor suspects that this common sense may decrease the usability of the remote controller. Thus, in contrast to the above common sense, the present inventor provides the studio camera adaptor with a remote controller attachment unit, and attaches the remote controller to the attachment unit. As a result, the studio camera adaptor is placed at a position higher than the pan bar, and thereby the legs of the audience do not interfere with the operation of the remote controller. As a result, this facilitates shooting. Thus, the present invention is completed.

Examples of the remote controller include a single controller capable of adjusting three settings, such as the zoom, focus, and aperture. Also the examples include a zoom controller capable of adjusting only the zoom, a focus controller capable of adjusting only the focus, and a focus/aperture controller capable of adjusting both the focus and the aperture. When the zoom controller and the focus/aperture controller are used for capturing videos, there is an advantage of the possibility of simultaneously adjusting the zooming and the focus/aperture by, for example, operating the zoom controller with the right hand and operating the focus/aperture controller with the left hand. In the above case, two pan bars are necessary for attaching the zoom controller and the focus/aperture controller. Because the tripod usually has a single pan bar, there is a need to additionally purchase and mount a pan bar. In the present invention, one or both of the zoom controller and the focus/aperture controller are attachable to the studio camera adaptor, and thereby no additional pan bar is necessary.

Various embodiments of the present invention will be described below as examples. The following embodiments may be combined with each other.

Preferably, the studio camera adaptor further includes a tally display unit provided at a front end of the bottom part and controlled based on tally signals from the switcher.

Preferably, the studio camera adaptor further includes a stand-by display unit provided at a front end of the bottom part controlled based on a stand-by signal from a camera operator.

Preferably, one of the studio camera adaptor and the remote controller further includes a stand-by signal output unit outputting a stand-by signal and operated by the camera operator, wherein the stand-by signal is received by the stand-by display unit.

Preferably, the studio camera adaptor further includes a signal transmission adaptor attachment unit configured to slide along a rail provided to the main body unit for having a signal transmission adaptor attached thereto, the signal transmission adaptor being used for signal transmission with a switcher.

Preferably, the studio camera adaptor further includes a signal relay provided on a main-body-unit-side surface of the signal transmission adaptor attachment unit.

Preferably, the signal relay includes:

a camera video signal input unit configured to receive an input of a camera video signal from the portable video camera;

a return video signal input unit configured to receive an input of a return video signal from a signal transmission adaptor;

a video selection signal input unit configured to receive an input of a video selection signal for selecting one of the camera video signal and the return video signal; and a video output unit configured to output the one of the camera video signal and the return video signal based on a state of the video selection signal.

Preferably, the studio camera adaptor further includes a view finder attachment unit provided at an upper part of the side wall part for having a view finder attached thereto.

Preferably, the view finder attachment unit is configured to have a plurality of view finders attached thereto:

the signal relay includes:

a camera video signal input unit configured to receive an input of a camera video signal from the portable video camera;

a return video signal input unit configured to receive an input of a return video signal from a signal transmission adaptor; and a video output unit configured to output both the camera video signal and the return video signal; and the camera video signal and the return video signal are respectively received by view finders.

Preferably, the signal relay includes:

a tally signal input unit configured to receive an input of a tally signal from the signal transmission adaptor; and a tally signal output unit configured to output the tally signal.

Preferably, the signal relay includes:

a stand-by signal input unit configured to receive an input of a stand-by signal from a camera operator; and a stand-by signal output unit configured to output the stand-by signal.

Preferably, the stand-by signal outputted by the stand-by signal output unit is outputted to both the stand-by display unit and the signal transmission adaptor, and the stand-by signal is outputted to the switcher through the transmission adaptor.

The present invention provides, from another aspect, a studio camera adaptor system that includes:

the above studio camera adaptor; and a remote controller attachable to the remote controller attachment unit of the studio camera adaptor and used for adjusting at least one of zoom, focus, and aperture of the portable video camera.

EMBODIMENT FOR CARRYING OUT THE INVENTION

Figure 1:
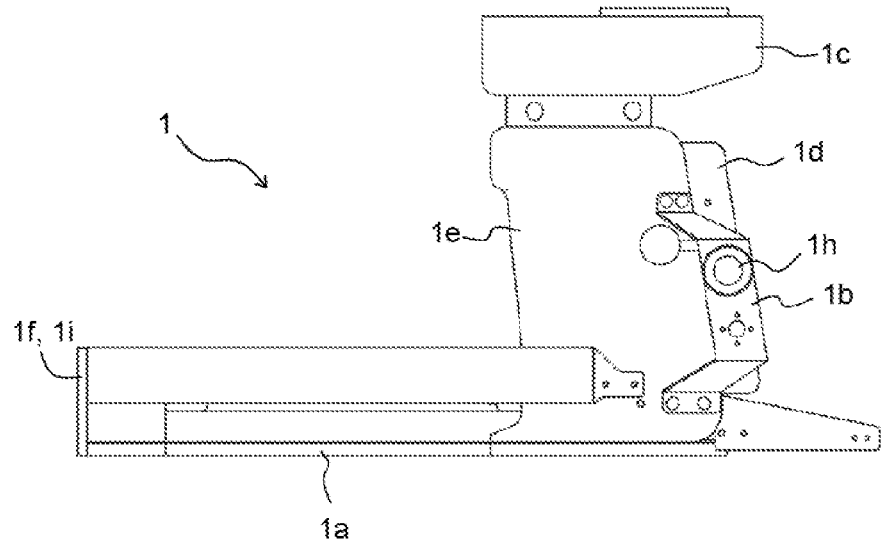
FIG. 1 is a right side view illustrating a state where a studio camera adaptor 1 according to one embodiment of the present invention has no portable video camera 3 attached thereto.

A studio camera adaptor 1 according to one embodiment of the present invention will be described below with reference to FIGS. 1 to 10. Embodiments shown below are examples, and thereby the present invention is not limited to the following embodiments.

The studio camera adaptor 1 is employed such that a portable video camera 3 is used as a studio camera. The studio camera adaptor 1 has a main body unit and a remote controller attachment unit 1h. The main body unit has a bottom part 1a for having the portable video camera 3 attached thereto and a side wall part 1e rising from the bottom part 1a. The remote controller attachment unit 1h is provided to the side wall part 1e for having a remote controller attached thereto, the remote controller being used for the adjustment of at least one of the zoom, focus, and aperture of the portable video camera 3.

Figure 2:
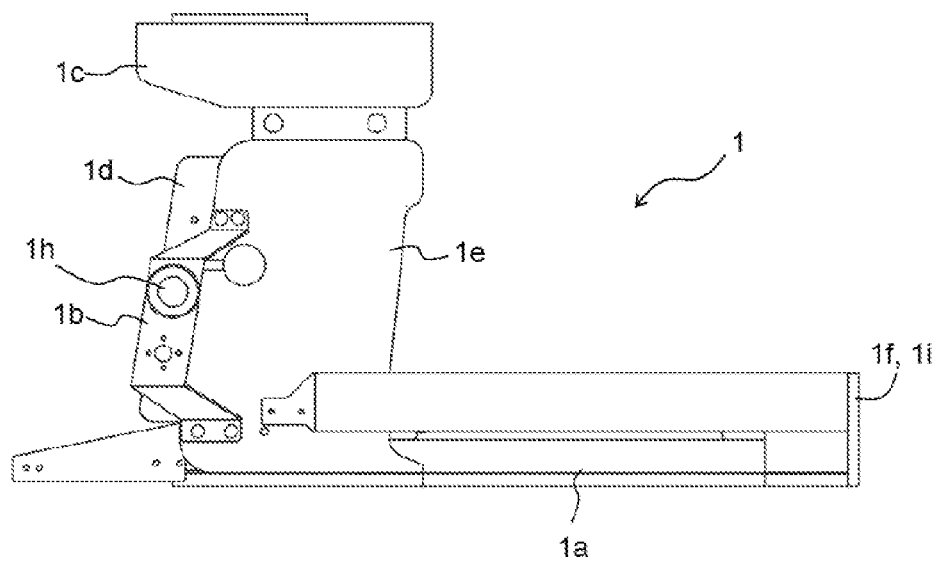
FIG. 2 is a left side view illustrating a state, where the studio camera adaptor 1 according to the one embodiment of the present invention has no portable video camera 3 attached thereto.

More specifically, the studio camera adaptor 1 has, as shown in FIGS. 1 and 2, the main body unit, an attachment bracket 1b, the remote controller attachment unit 1h, a view finder attachment unit 1c, a signal transmission adaptor attachment unit 1d, a tally display unit 1f, and a stand-by display unit 1i. The main body unit has the bottom part 1a and the side wall part 1e rising from the bottom part 1a. The attachment bracket 1b is provided to the side wall part 1e. The remote controller attachment unit 1h is provided to the attachment bracket 1b. The view finder attachment unit 1c is provided to an upper part of the side wall part 1e. The signal transmission adaptor attachment unit 1d is supported to be slidable along the rail provided to the main body unit. The tally display unit if and the stand-by display unit 1i are provided to the front end of the studio camera adaptor 1.

Figure 3:
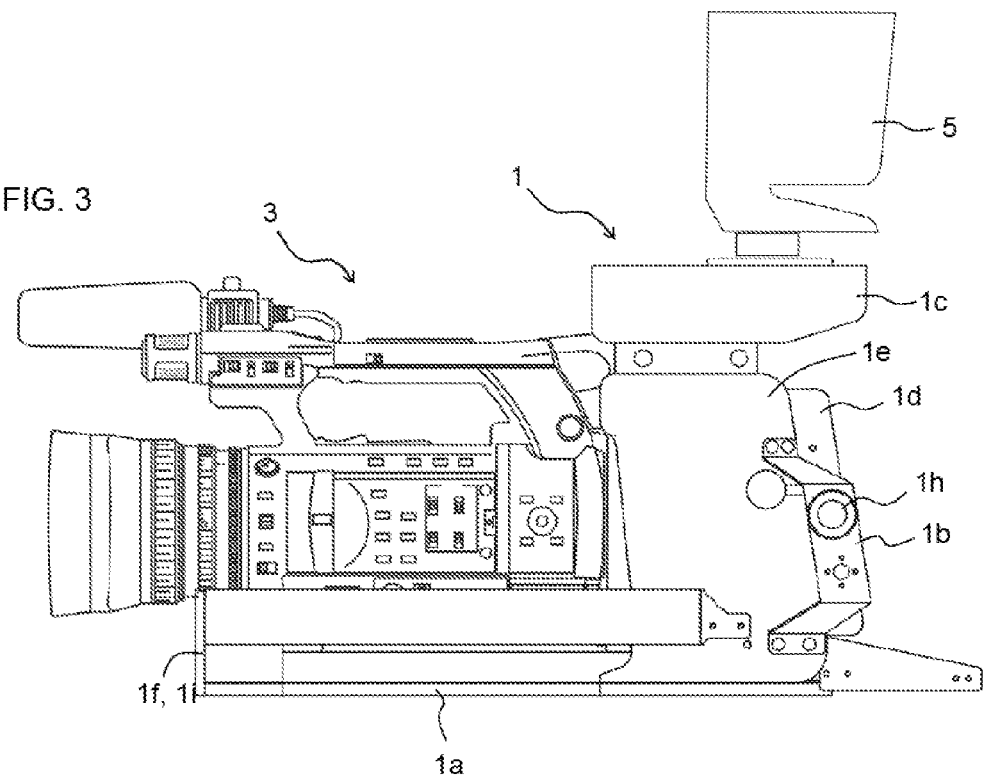
FIG. 3 is a view corresponding to FIG. 1 for illustrating a state, where the studio camera adaptor 1 has the portable video camera 3 attached thereto.

The portable video camera 3, as shown in FIG. 3, is provided on the bottom part 1a, and is, for example, fixed by a screw to the bottom part 1a using a threaded hole provided in the bottom part 1a. In the present specification, the term "portable video camera" indicates a video camera smaller than a general studio camera and easy to carry, and is generally used on-location. The term "portable video camera" is defined as above just in order to differentiate portable video cameras from studio cameras, and thereby the scope of the term "portable video camera" should not be interpreted narrower than intended.

The view finder attachment unit 1c has the view finder 5 attached thereto. The view finder 5 has a video input terminal receiving camera video signals from the portable video camera 3 and return video signals from the switcher, and the view finder 5 is capable of providing a display based on the video signals received by the terminal. The view finder attachment unit 1c may be configured to have a single view finder 5 attached thereto. Alternatively, the view finder attachment unit 1c may be preferably configured to have multiple view finders 5 attached thereto. Camera operators usually shoot a scene while he/she checks both the video ("camera video"), which he/she is currently shooting, and the return video from the switcher. Conventionally, the camera video and the return video are usually switched to be displayed in the view finder 5. In the above method, it is impossible to observe the camera video when the return video is displayed, and thereby making shooting difficult. Also, another example of the method includes providing multiple screens in the single view finder 5 to enable the camera operator to simultaneously observe both the camera video and the return video. In the above method, however, the resolution of the videos each displayed in the view finder 5 decreases and thereby making it difficult to check the video being actually shot. In view of such situation, the present inventor attaches multiple view finders 5 to the view finder attachment unit 1c, and camera video signals and return video signals are fed to the respective view finders 5. As a result, the above problem is successfully solved, and the camera operator is capable of simultaneously checking high resolution camera video and return video.

Figure 4:
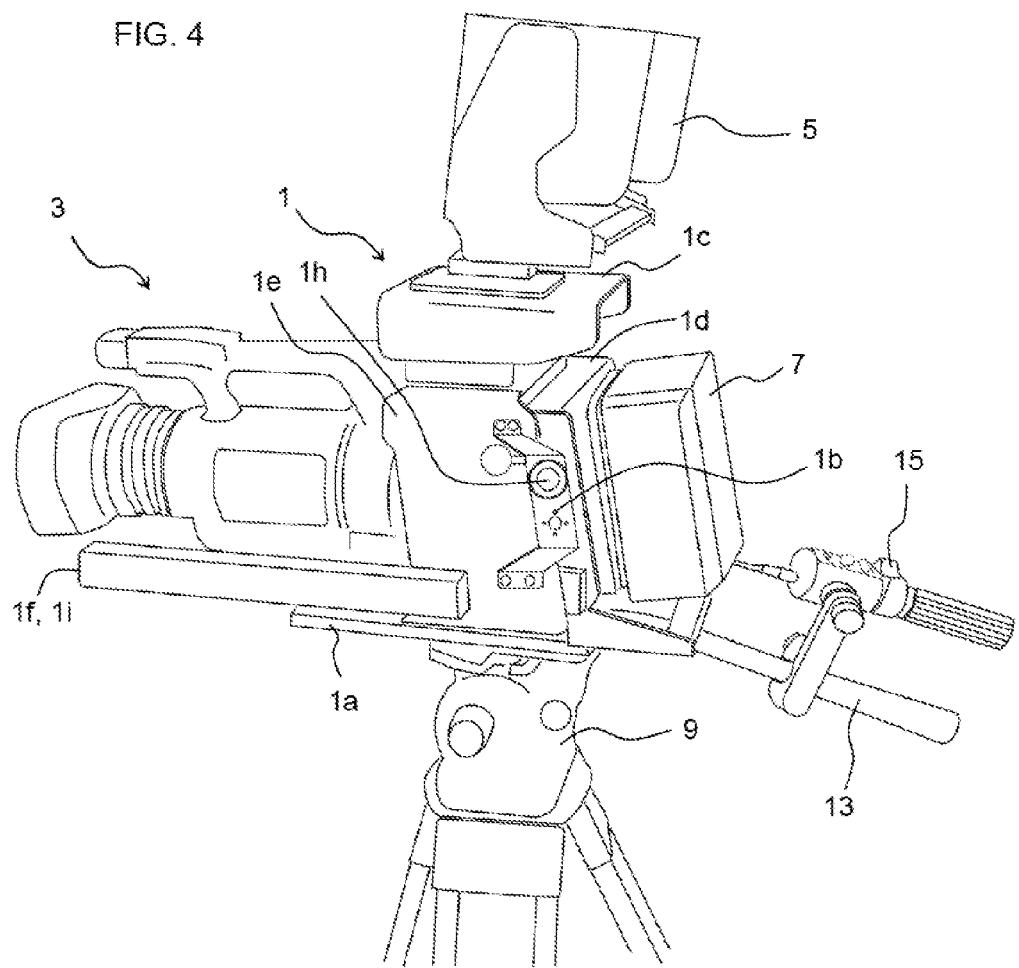
FIG. 4 is a perspective view illustrating a state, where the studio camera adaptor 1 in FIG. 1 has the portable video camera 3, a view finder 5, and a signal transmission adaptor 7 all attached thereto, and the studio camera adaptor 1 is attached to a tripod 9.
Figure 5:
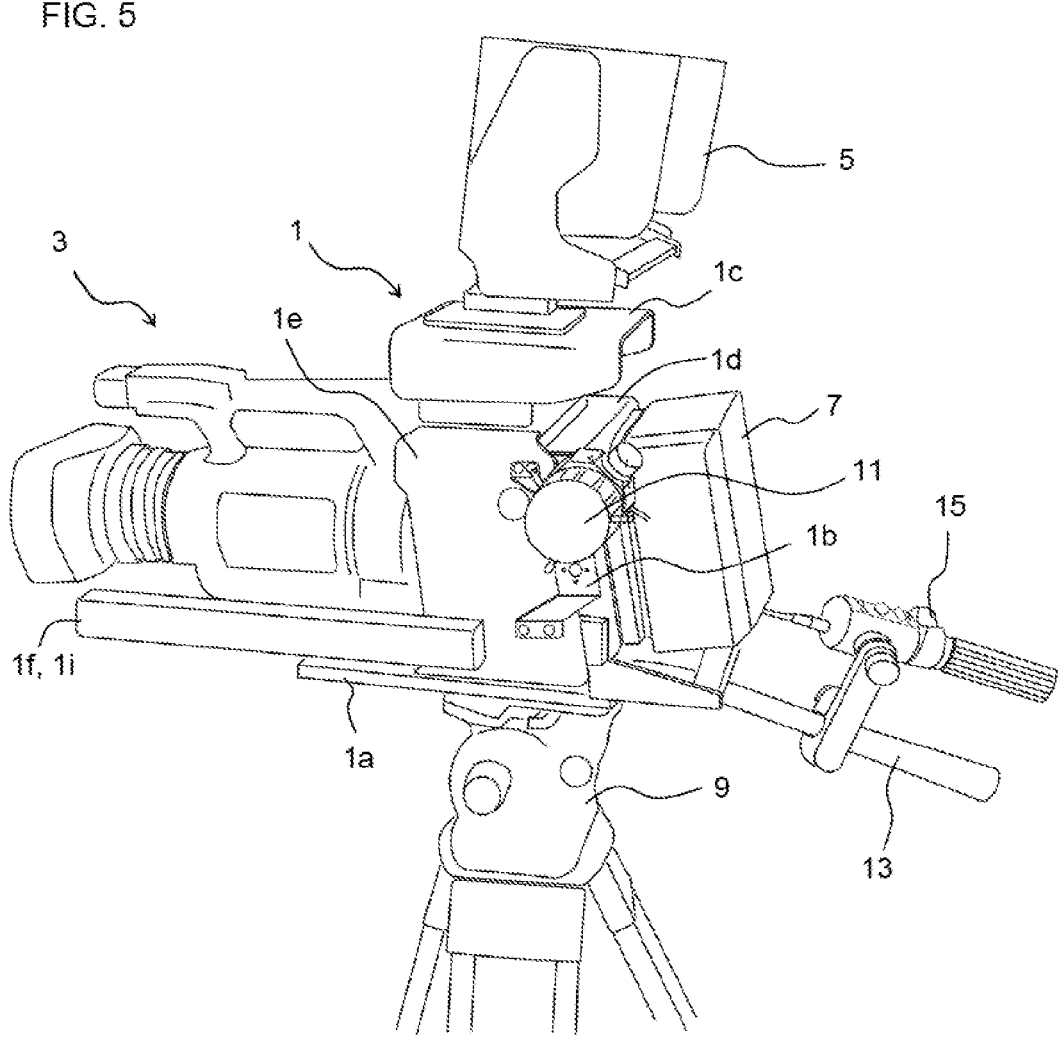
FIG. 5 is a perspective view illustrating a state, where the studio camera adaptor 1 in FIG. 4 has a focus/aperture controller 11 attached thereto.

The studio camera adaptor 1, as shown in FIGS. 4 and 5, is provided to a tripod 9. The tripod 9 has a pan bar 13 attached thereto, and the pan bar 13 has a zoom controller 15 attached thereto. A focus/aperture controller 11 is attached, as shown in FIG. 5, to the remote controller attachment unit 1h. The remote controller attachment unit 1h is preferably configured to have an employed remote controller directly attached thereto. As above, in a case, where the tripod 9 has only a single pan bar 13, if the pan bar 13 has the zoom controller 15 attached thereto, it is impossible to attach the focus/aperture controller 11. As a result, the pan bar 13 is additionally purchased and is attached to the tripod 9, and then the focus/aperture controller 11 is attached to the added pan bar 13. However, the additional purchase of the pan bar 13 takes time and costs money. Furthermore, it is also difficult to operate the focus/aperture controller 11 attached to the pan bar 13 located at a lower position if used in a narrow place, such as audience seats in a studio. In the present embodiment, the side wall part 1e of the studio camera adaptor 1 is provided with the remote controller attachment unit 1h. If the focus/aperture controller 11 is attached to the side wall part 1e, the additional purchase of the pan bar 13 is not required, and also because the focus/aperture controller 11 is located at the relatively high position, operability of the controller 11 is substantially improved. Note that in the present embodiment, the remote controller attachment unit 1h is provided to the attachment bracket 1b, and the attachment bracket 1b is fixed to the side wall part 1e. Alternatively, the remote controller attachment unit 1h may be directly provided to the side wall part 1e.

Figure 6:
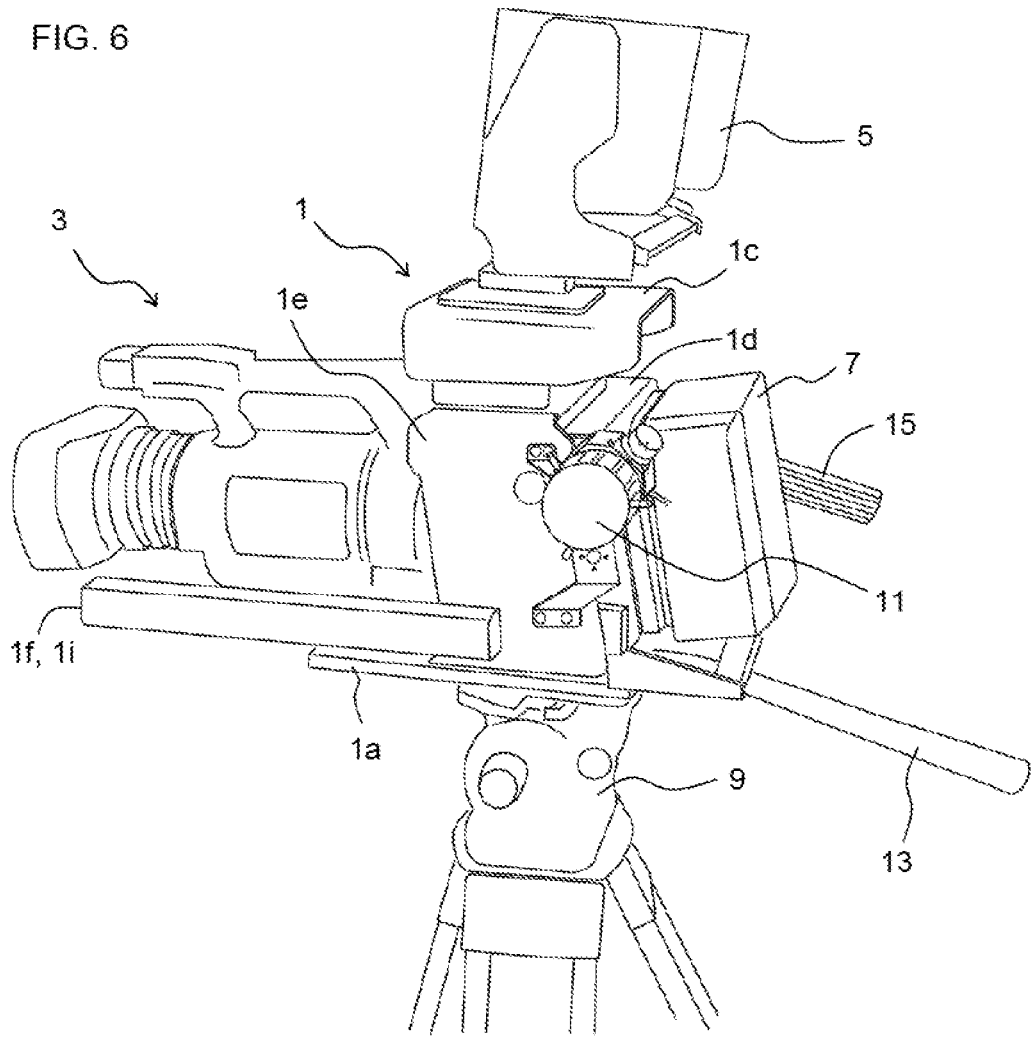
FIG. 6 is a perspective view illustrating a state, where the studio camera adaptor 1 has a zoom controller 15, which is alternatively attached to a pan bar 13 in FIG. 5.
Figure 7:
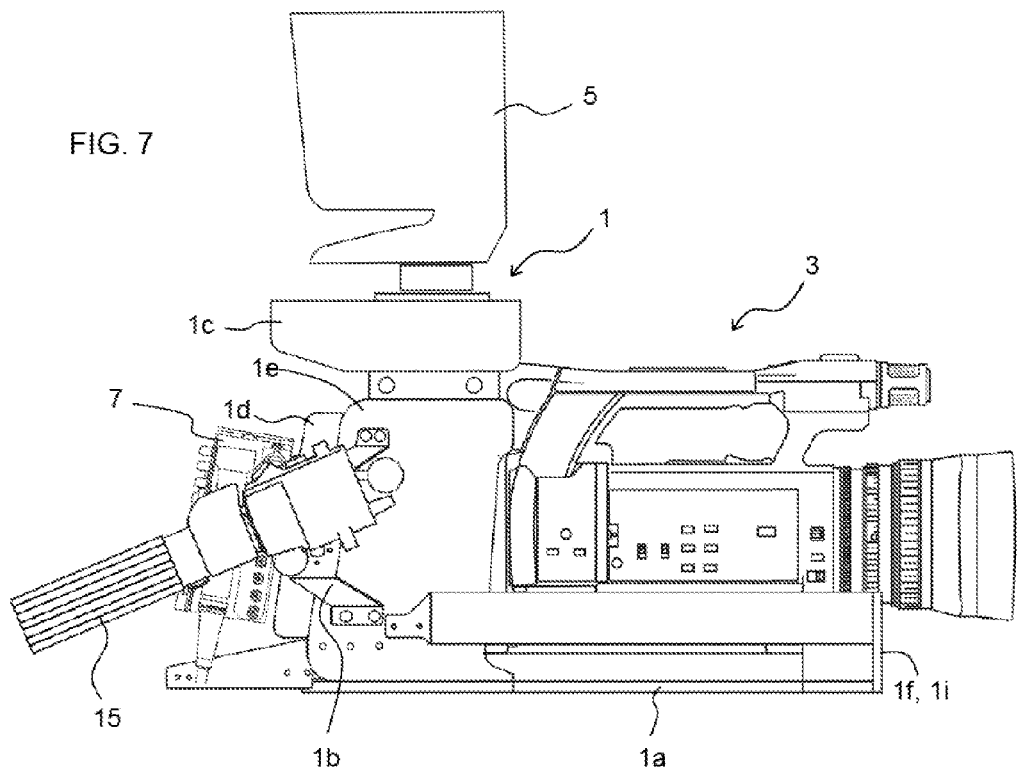
FIG. 7 is a left side view illustrating a state similar to that in FIG. 6 except that the tripod 9 is removed.

FIGS. 6 and 7 illustrate another embodiment. In the present embodiment, the zoom controller 15 and the focus/aperture controller 11 are attached to the remote controller attachment units 1h respectively provided to left and right side surface parts 1e of the studio camera adaptor 1. In the embodiment shown in FIG. 5, because the zoom controller 15 is attached to the pan bar 13, it is difficult to operate the zoom controller 15 in a narrow place. However, in the embodiment shown in FIGS. 6 and 7, because the zoom controller 15 and the focus/aperture controller 11 are attached to the studio camera adaptor 1, both of the controllers are easy to operate.

The bottom part 1a of the studio camera adaptor 1 has the tally display unit If and the stand-by display unit 1i provided at a front end thereof. The tally display unit 1f is controlled based on tally signals from the switcher, and the stand-by display unit 1i is controlled based on stand-by signals from the camera operator. When multiple video cameras are used for shooting, the tally display unit 1f of a camera, which is currently used by the switcher, and the tally display unit 1f of another camera, which will be subsequently used by the switcher, are turned on in order to inform program staff and program performers of the camera to pay attention to. In general, the view finder 5 has a tally display unit. When used in a narrow place, the view finder 5 is positioned to face in a lateral direction (in other words, the view finder 5 is horizontally rotated 90 degrees). In the above case, if the view finder 5 has the tally display unit, for example, on its back side, the tally display is invisible to the person standing in front of the video camera. In contrast, the tally display unit 1f is provided at a front end of the bottom part 1a in the present embodiment, and thereby the tally display is readily visible to the person standing in front of the video camera whatever direction view finder 5 is oriented in.

Also, in conventional shooting systems, there has been no method other than using audio systems, such as an intercom, in order for the camera operators to notify the switcher of their readiness on stand-by. In the present embodiment, the studio camera adaptor 1 or the remote controller (e.g., the zoom controller 15, the focus/aperture controller 11) is provided with a stand-by signal output unit enabling the camera operator to output stand-by signals, and the outputted stand-by signals are received by the stand-by display unit 1i. Due to the above configuration, the camera operator is capable of notifying the shooting target of the stand-by state. Also, the stand-by signals are transmitted to the switcher through the signal transmission adaptor 7. As a result, the switcher is capable of knowing the stand-by state of the camera operator.

Figure 8:
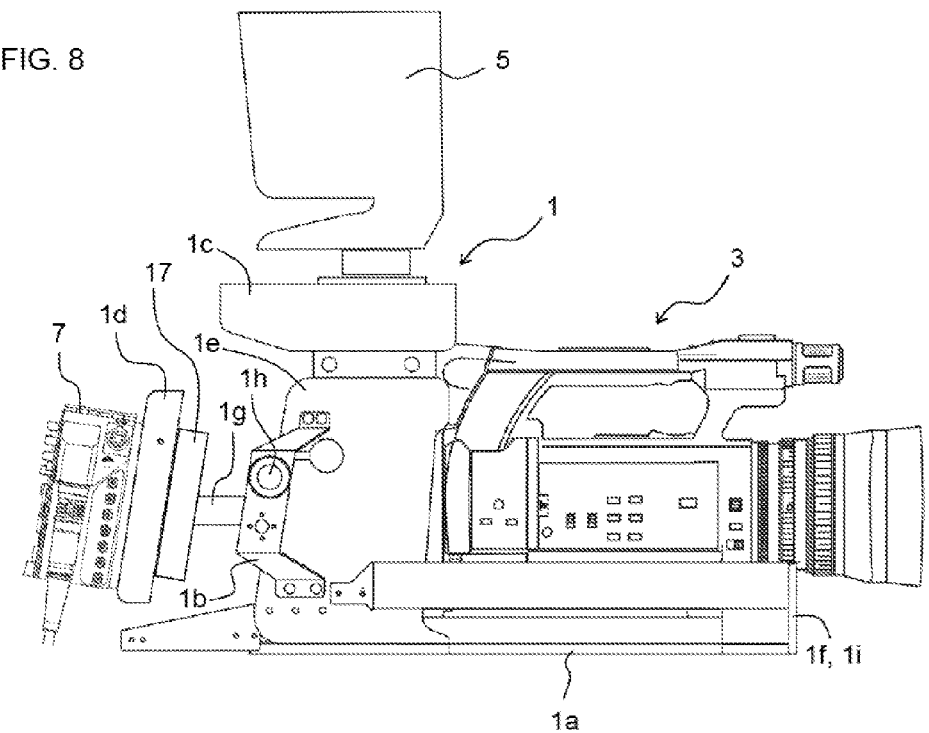
FIG. 8 is a left side view illustrating a state similar to that in FIG. 7 except that the zoom controller 15 is removed and an attachment unit for having the signal transmission adaptor 7 attached thereto slides backwardly.

The main body unit of the studio camera adaptor 1 has the signal transmission adaptor attachment unit 1d at the back part thereof. The signal transmission adaptor attachment unit 1d is usually, as shown in FIG. 5, integrated into the main body unit when used. As shown in FIG. 8, however, the signal transmission adaptor attachment unit 1d is configured to be slidably and backwardly displaced along a rail 1g provided to (the bottom part 1a or the side wall part 1e) of the main body unit when wiring a signal relay unit 17 is conducted. The signal transmission adaptor attachment unit 1d has the signal relay unit 17 attached to a main-body-unit-side surface thereof, and the slidably and backwardly displacing of the signal transmission adaptor attachment unit 1d facilitates the wiring of the signal relay unit 17.

The signal transmission adaptor attachment unit 1d has the signal transmission adaptor 7 attached thereto for transmitting and receiving signals with the switcher. The signal transmission adaptor 7 may transmit and receive signals as electric signals. Alternatively, the adaptor 7 may transmit and receive optical signals through an optical cable once after the electric signals have been converted into the optical signals. More specifically, the signal transmission adaptor 7 transmits, to the switcher, camera video signals received from the portable video camera, and receives return video signals from the switcher. Also, various control signals (such as tally signals, later-described stand-by signals, synchronous signals) are transmitted and received.

Figure 9:
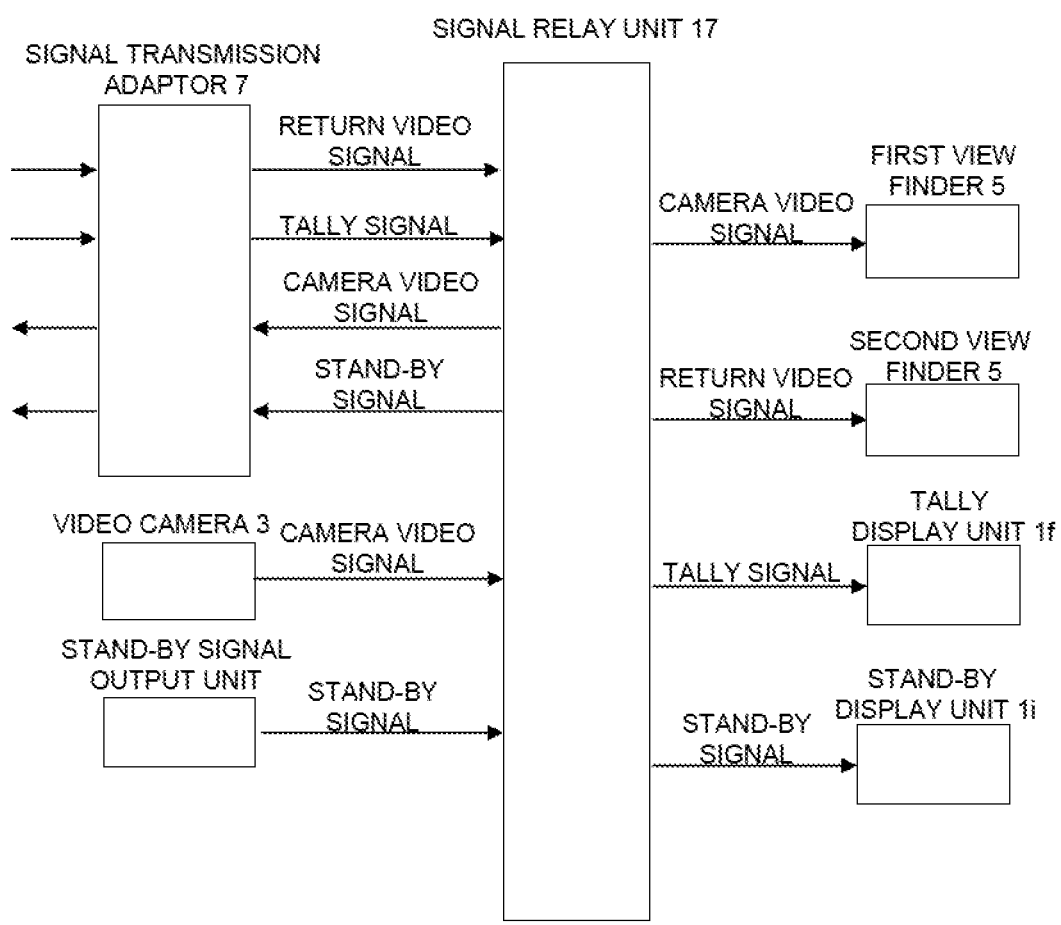
FIG. 9 is a wiring diagram of a signal relay unit 17 when two view finders are used.
Figure 10:
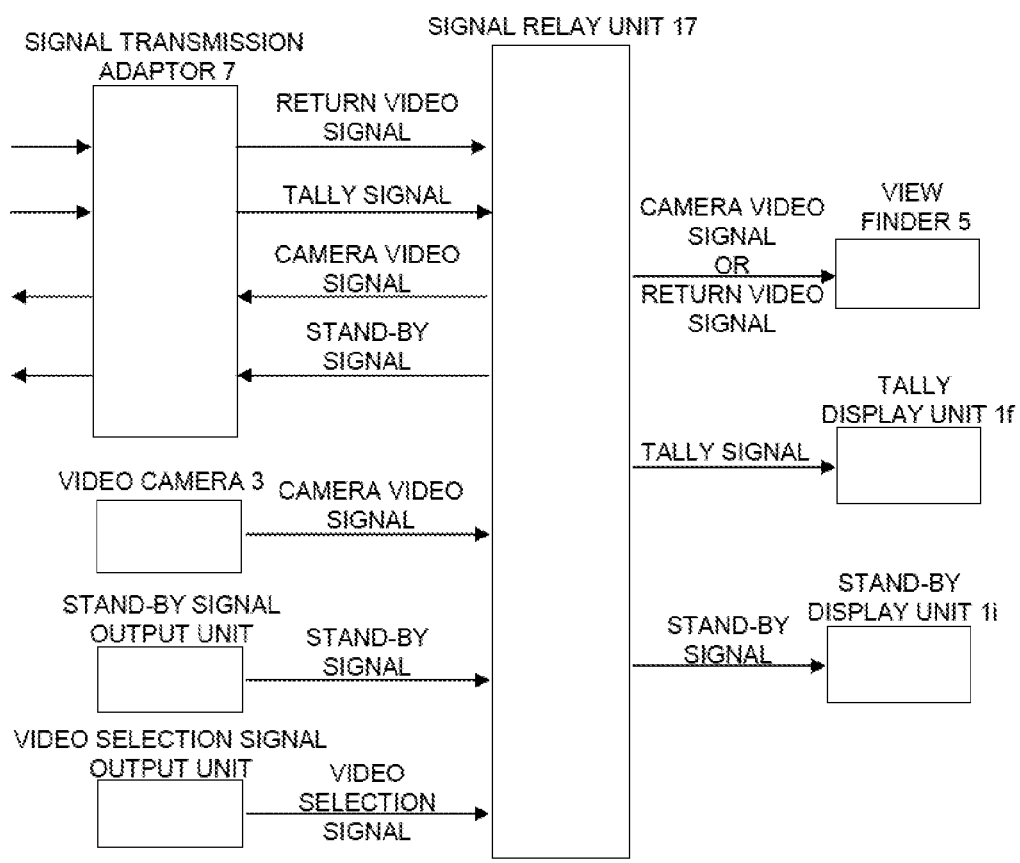
FIG. 10 is a wiring diagram of the signal relay unit 17 when the signal relay unit 17 has a function to select and output videos.

As shown in wiring diagrams of FIGS. 9 and 10, the signal relay unit 17 relays various video signals and control signals. Because components for signal transmission are wired through the signal relay unit 17, excessive force is prevented from being accidentally applied to the cables, and thereby it is possible to prevent disconnection of cables caused by excessive force. Also, because the components are wired through the signal relay unit 17, the number of times cables are inserted and extracted is reduced, and thereby it is possible to prevent damage to connectors thereof.

In the wiring of FIG. 9, both the camera video signals and the return video signals are received by the signal relay unit 17, and the camera video signals and the return video signals are, without any process, outputted and received respectively by the first view finder 5 and the second view finder 5. As above, because the camera video signals and the return video signals are outputted to the respective view finders, high resolution camera video and return video are simultaneously observable.

In the wiring of FIG. 10, the signal relay unit 17 includes a video selection signal input unit and a video output unit. The video selection signal input unit receives input of the video selection signal (return signal) outputted by the video selection signal output unit. The video output unit outputs one of the camera video signal and the return video signal based on the state of the video selection signal. Due to the above configuration, even when the view finder 5 has no input terminal for the return video signals, it is possible to cause the view finder 5 to display videos of the camera video signal and the return video signal by switching the signals. The video selection signal output unit (e.g., return signal output button) may be alternatively provided to the studio camera adaptor 1 or to the remote controller (e.g., the zoom controller 15, the focus/aperture controller 11). In a case, where the video selection signal output unit is provided to the focus/aperture controller 11, it is possible to output the video selection signals by operating the video selection signal output unit with the left hand and by operating the zoom controller 15 with the right hand, for example. The remote controller may be a focus controller used to adjust focus, instead of the focus/aperture controller 11.

Also, the signal relay unit 17 is preferably capable of switching the wiring configuration thereof between the wiring in FIG. 9 and the wiring in FIG. 10. In the above case, for example, if there is a single view finder 5 as in FIG. 10, the video signal is outputted based on a state of the video selection signal. If there are two view finders 5, the camera video signal and the return video signal may be, without any process, outputted thereto. The switching of the above two wiring configurations may be automatically conducted based on the result of determining whether the signal output unit is connected with the view finder 5, or may be manually conducted by operating a switch provided to the signal relay unit 17.

DESCRIPTION OF THE NUMERALS

1: studio camera adaptor, 3: portable video camera, 5: view finder, 7: signal transmission adaptor, 9: tripod, 11: focus/aperture controller, 13: pan bar, 15: zoom controller, 17: signal relay unit

The invention claimed is:

1. A studio camera adaptor for using a portable video camera as a studio camera comprising:

a main body unit including:
  a bottom part for having the portable video camera attached thereto, and
  a side wall part connected to and rising from the bottom part;
a remote controller attachment unit provided to the side wall part for having a remote controller attached thereto, the remote controller being used for adjustment of at least one of zoom, focus, and aperture of the portable video camera, wherein the side wall part is provided remote from a lens and a lens barrel of the portable video camera;
a signal transmission adaptor attachment unit configured to slide along a rail provided to the main body unit for having a signal transmission adaptor attached thereto, the signal transmission adaptor being used for signal transmission with a switcher; and
a signal relay provided on a main-body-unit-side surface of the signal transmission adaptor attachment unit, wherein the signal relay includes:
  a camera video signal input unit configured to receive an input of a camera video signal from the portable video camera;
  a return video signal input unit configured to receive an input of a return video signal from a signal transmission adaptor;
  a video selection signal input unit configured to receive an input of a video selection signal for selecting one of the camera video signal and the return video signal; and
  a video output unit configured to output the one of the camera video signal and the return video signal based on a state of the video selection signal.

2. The studio camera adaptor according to claim 1 further comprising:
a tally display unit provided at a front end of the bottom part and controlled based on a tally signal from a switcher.

3. The studio camera adaptor according to claim 1 further comprising:
a stand-by display unit provided at a front end of the bottom part and controlled based on a stand-by signal from a camera operator.

4. The studio camera adaptor according to claim 3 wherein:
one of the studio camera adaptor and the remote controller further includes a stand-by signal output unit outputting a stand-by signal and operated by the camera operator, wherein the stand-by signal is received by the stand-by display unit.

5. The studio camera adaptor according to claim 1 further comprising:
a view finder attachment unit provided at an upper part of the side wall part for having a view finder attached thereto.

6. A studio camera adaptor for using a portable video camera as a studio camera comprising:
a main body unit including:
  a bottom part for having the portable video camera attached thereto, and
  a side wall part connected to and rising from the bottom part;
a remote controller attachment unit provided to the side wall part for having a remote controller attached thereto, the remote controller being used for adjustment of at least one of zoom, focus, and aperture of the portable video camera, wherein the side wall part is provided remote from a lens and a lens barrel of the portable video camera;

a signal transmission adaptor attachment unit configured to slide along a rail provided to the main body unit for having a signal transmission adaptor attached thereto, the signal transmission adaptor being used for signal transmission with a switcher;

a signal relay provided on a main-body-unit-side surface of the signal transmission adaptor attachment unit; and a view finder attachment unit provided at an upper part of the side wall part for having a view finder attached thereto;

wherein the view finder attachment unit is configured to have a plurality of view finders attached thereto;

wherein the signal relay includes:
   a camera video signal input unit configured to receive an input of a camera video signal from the portable video camera,
   a return video signal input unit configured to receive an input of a return video signal from a signal transmission adaptor, and
   a video output unit configured to output both the camera video signal and the return video signal; and wherein the camera video signal and the return video signal are respectively received by view finders.

7. The studio camera adaptor according to claim 1, wherein the signal relay includes:
   a tally signal input unit configured to receive an input of a tally signal from the signal transmission adaptor; and
   a tally signal output unit configured to output the tally signal.

8. A studio camera adaptor for using a portable video camera as a studio camera comprising:
   a main body unit including:
     a bottom part for having the portable video camera attached thereto, and
     a side wall part connected to and rising from the bottom part;
   a remote controller attachment unit provided to the side wall part for having a remote controller attached thereto, the remote controller being used for adjustment of at least one of zoom, focus, and aperture of the portable video camera, wherein the side wall part is provided remote from a lens and a lens barrel of the portable video camera;
   a signal transmission adaptor attachment unit configured to slide along a rail provided to the main body unit for having a signal transmission adaptor attached thereto, the signal transmission adaptor being used for signal transmission with a switcher; and
   a signal relay provided on a main-body-unit-side surface of the signal transmission adaptor attachment unit;
   wherein the signal relay includes:
     a stand-by signal input unit configured to receive an input of a stand-by signal from a camera operator; and
     a stand-by signal output unit configured to output the stand-by signal.

9. The studio camera adaptor according to claim 8, wherein:
   the stand-by signal outputted by the stand-by signal output unit is outputted to both the stand-by display unit and the signal transmission adaptor, and the stand-by signal is outputted to the switcher through the signal transmission adaptor.

10. A studio camera adaptor system comprising:
   the studio camera adaptor according to claim 1;
   the remote controller being directly attached to the remote controller attachment unit; and
   the remote controller is used for adjustment of at least the focus and includes a video selection signal output unit outputting the video selection signal.

\* \* \* \* \*